(12) United States Patent
Hsu

(10) Patent No.: US 6,182,075 B1
(45) Date of Patent: Jan. 30, 2001

(54) METHOD AND APPARATUS FOR DISCOVERY OF DATABASES IN A CLIENT SERVER NETWORK

(75) Inventor: Juliana M. Hsu, Scarborough (CA)

(73) Assignee: International Business Machines Corporation, Armonk, NY (US)

( * ) Notice: Under 35 U.S.C. 154(b), the term of this patent shall be extended for 0 days.

(21) Appl. No.: 09/061,512

(22) Filed: Apr. 16, 1998

(30) Foreign Application Priority Data

Sep. 26, 1997 (CA) .................................... 2216901

(51) Int. Cl.[7] .................................................. G06F 17/30
(52) U.S. Cl. .............................. 707/10; 709/227; 709/230
(58) Field of Search ..................... 707/1–4, 10; 709/202, 709/219, 223–230

(56) References Cited

U.S. PATENT DOCUMENTS

| | | | | |
|---|---|---|---|---|
| 5,848,415 | * | 12/1998 | Guck ........................................ | 707/10 |
| 5,899,990 | * | 5/1999 | Maritzen et al. .......................... | 707/4 |
| 5,987,515 | * | 11/1999 | Ratcliff et al. ........................... | 709/224 |
| 6,011,803 | * | 1/2000 | Bicknell et al. .......................... | 370/467 |
| 6,076,106 | * | 6/2000 | Hamner et al. ........................... | 709/223 |

* cited by examiner

Primary Examiner—Hosain T. Alam
(74) Attorney, Agent, or Firm—Jeanine S. Ray-Yarletts

(57) ABSTRACT

This invention relates to client server information handling networks having one or more database server systems in which a method and means are provided for database clients to identify and access database servers which are on the network or interconnected therewith in such a manner that they are accessible from said network by providing a method and apparatus for implementing a client server information handling network having one or more database server systems controlling at least one database, at least one database client and a communications link between the servers and the client; the network including: discovery module for the database client to identify database servers accessible with the network. The discovery module includes: a search discovery module associated with the database client for generating a database discovery inquiry including a database search discovery request to identify the database server systems; a database discovery manager module associated with the database servers, the database discovery manager module being adapted to respond to the search discovery request by returning addressing information to permit access to the database servers by the database client.

33 Claims, 7 Drawing Sheets

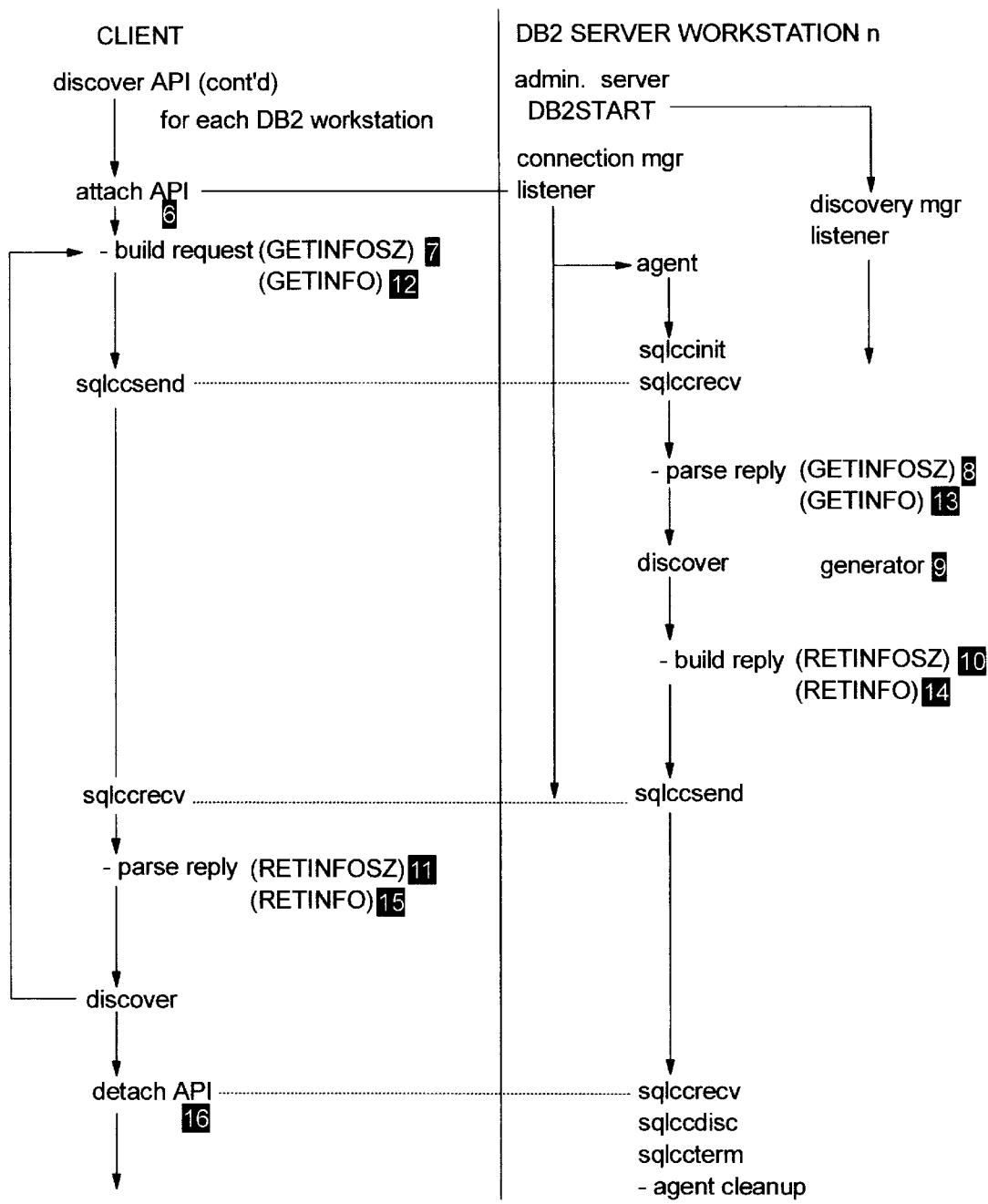

METHOD AND APPARATUS FOR DISCOVERY OF DATABASES IN A CLIENT SERVER NETWORK

FIELD OF THE INVENTION

This invention relates to client server information handling networks having one or more database server systems in which a method and means are provided for database clients to identify and access database servers which are on the network or interconnected therewith in such, a manner that they are accessible from the network.

BACKGROUND OF THE INVENTION

In client server networks having database servers, when a client desires to access one or more of the database servers the client requires communications information for each server. This communications information includes the protocols supported by the server and the protocol specific address information, which may include one or more items of data. For instance in networks using the TCP/IP protocol, the address includes a port number or service name and host name or IP address. Using the NETBIOS protocol, an Nname (workstation name) and local adapter is required. Using the IPX/SPX protocol, an internetwork address is required comprising an <8 byte net ID>·<12 byte node ID>·<4 byte socket #>. Using the APPC protocol, a significant amount of complex information is required for accessing databases connected to a network.

Considering the DB2 database management products introduced by IBM several years ago the establishment of a client server connection to access a database requires a user of a database client to have knowledge of a number of items of information. Before a connection can be established, the user must catalog a node and database directory. To catalog a node directory the user must have an intersection of the protocols supported by both the database client and database server, and enough protocol-specific communications information to communicate from the database client to database server. For example to connect to a DB2 server by using the TCP/IP protocol, the user must specify a host name or IP address, and a service name or port number in the node directory entry. To catalog a database directory the user must specify the database name. One of the problems inherent in this procedure is that it requires the user to know which databases are available and to have sufficient skill and communications information to catalog the entries required to access the database. It would be preferable for the database client to be able to simply identify the databases to which the user can have access and to simplify the mode by which the user can connect to those databases.

SUMMARY OF THE INVENTION

The invention herein provides these and other advantages over prior systems. One implementation of the invention provides a client server information handling network having at least one database server system controlling at least one database, at least one database client and a communications link between the servers and the client; the network including:

discovery module for the database client to identify database servers accessible with the network. The discovery module includes:

a search discovery module associated with the database client for generating a database discovery inquiry including a database search discovery request to identify the database server systems;

a database discovery manager module associated with the database servers, the database discovery manager module being adapted to respond to the search discovery request by returning addressing information to permit access to the database servers by the database client.

The network may include a module for the client to respond to receive the addressing information provided by the database discovery manager module and to display the information to a user of the client.

The network of claim may include a known discovery module for the client for generating a database know; discovery request to a selected database server system previously identified to determine detailed database server system information.

The database connection manager module associated with the selected database server system may be adapted to respond to the known discovery request by packaging detailed database server system information relating to the selected database server system to permit access to databases on the system.

A module may be provided for the client to respond to receive the detailed database server system information and to display the information to a user of the client.

A graphical display interface (GUI) is preferably used to display server system information to a user, the GUI being adapted to respond to user input to initiate the search discovery request and the known discovery request.

The GUI should be responsive to the selection by a user, to initiate the search discovery request, and display server system names returned, and be further responsive to the selection of a database server system displayed on the GUI to expand the display of the selected database server system by initiating the generation of a known search request and depicting the detailed server system information returned in treelike fashion identifying the databases controlled by the selected database server system.

The GUI is responsive to user selection of an identified database by auto-configuring for a database access request.

The database server system may control a plurality of database server instances, and wherein each of the database server instances controls at least one database.

The database server system may include:

discovery manager and connection manager module adapted to listen for discovery requests on the network, and comprised of:

request receiver module to receive the discovery requests, request parser module to parse the requests for processing, request service module for responding to the parsed requests, and in response to:

(a) the receipt of a search discovery request obtains and packages database server system name and protocol - specific addressing information, and (b) the receipt of a known discovery request for a specified database server system, obtains and packages detailed information for any database server instances associated with the specified database server system and databases controlled by the database server instances; and communications response module adapted to transmit the packaged database server system addressing information and the packaged detailed database server system information to any database client requesting the information.

The modules mentioned above preferably are embodied in software routines. Modules identified singularly can be replaced by multiple modules and conversely multiple modules could be replaced by singular modules.

Another aspect of the invention is embodied in the method of operation of the client server network described for identifying (and then accessing databases as desired) including:

generating a database discovery inquiry for the client including a database search discovery request to identify the database server systems;

using database discovery manager module associated with the database server system to respond to the search discovery request by returning addressing information to permit access to the database servers by the database client.

The database client responds to receive the addressing information provided by the database discover manager module to display the information to a user of the database client.

The method preferably includes generating a database known discovery request for the client to a selected database server system previously identified to determine detailed database server system information.

The selected database server responds to the known discovery request by packaging detailed database server system information relating to the selected database server system to permit access to databases on the system.

The client responds to receive the detailed database server system information and displays the info ration to a user of the client.

A graphical display interface module (GUI) responds to user input to initiate the search discovery request and the known discovery request.

The GUI responds to selection by a user to initiate the search discovery request, it displays server system names returned, and further responds to the selection of a database server system displayer on the GUI by expanding the display of the selected database server system through Initiation of a known discovery request. Detailed addressing information returned is displayed in treelike fashion, identifying the databases controlled by the selected database server system.

The GUI further responds to selection of an identified database by auto-configuring for a database access request.

The database server system in an embodiment of the invention listens for discovery requests on the network, receives the discovery requests, parses the requests for processing, responds to the parsed requests, and in response to:

(a) the receipt of a search discovery request obtains and packages database server system name and protocol— specific addressing information, and (b) the receipt of a known discovery request for a specified database server system, obtains and packages detailed information for any database server instances associated with the specified database server system and databases controlled by the database server instances;

and is adapted to transmit the packaged database server system addressing information and the packaged detailed database server system information to any database client requesting the information.

As was indicated, the invention may be implemented by a computer program product that may be conveniently stored on a storage medium such as tape or disk. The computer program product is designed for establishing a client server information handling network having at least ode database server system controlling at least one database, at least one database client and a communications link between the servers and the client. The computer program product includes:

a software routine for establishing a discovery module for the database client to identify database servers accessible with the network, the discovery module including:

search discovery module associated with the database client for generating a database discovery inquiry including a database search discovery request to identify the database server systems;

a software routine for establishing a database discovery manager module associated with the database servers, the database discovery manager module being adapted to respond to the search discovery request by returning addressing information to permit access to the database servers by the database client.

The computer program product may also include a software routine to establish a routine for the database client to respond to receive the addressing information provided by the database discovery manager module and to display the information to a user of the database client.

The computer program product may preferably also include a software routine for establishing a known discovery module for the database client for generating a database known discovery, request to a selected database server system previously identified to determine detailed database server system information.

The computer program product of claim can include a software routine for establishing a database connection manager module associated with the selected database server adapted to respond to the known discovery request by packaging detailed database server system information relating to the selected database server system to permit access to databases on the system.

The computer program product may further include a software routine for establishing a module associated with the database client to respond to receive the detailed database server system information and to display the information to a user of the database client.

The computer program product may also include a software routine for enabling a graphical display interface module (GUI) to respond to user input to initiate the search discovery request and the known discovery request. The software routine module enables the GUI to be responsive to a user to initiate the search discovery request, it displays server system names returned, and is further responsive to the selection of a database server system displayed on the GUI by expanding the display of the selected database server system through initiation of a known discovery request. Detailed addressing information returned is displayed in treelike fashion, identifying the databases controlled by the selected database server system.

The GUI may be further responsive to selection of an identified database by auto-configuring for a database access request.

In yet another embodiment, the computer program product may include software routines for establishing the database server system with:

discovery manager and connection manager modules adapted to listen for discovery requests on the network, and comprised of:

a request receiver module to receive the discovery requests, a request parser module to parse the requests for processing, request service module for responding to the parsed requests, and in response to:

(a) the receipt of a search discovery request obtains and packages database server system name and protocol— specific addressing information, and (b) the receipt of a known discovery request for a specified database server system, obtains and packages detailed information for any database server instances associated with the specified database server system and databases controlled by the database server instances; and a communications response module adapted to transmit the packaged database server system addressing information and the packaged detailed database server system information to any database client requesting the information.

BRIEF DESCRIPTION OF THE DRAWINGS

The invention is described herein together with the drawings of which a brief description follows:

FIG. 7 depicts a detailed flow chart of known discovery, in which either the search discovery method or an user specifies enough communications information to directly contact an administration server on the database server system.

DETAILED DESCRIPTION OF A PREFERRED EMBODIMENT OF THE INVENTION

Figure 1:
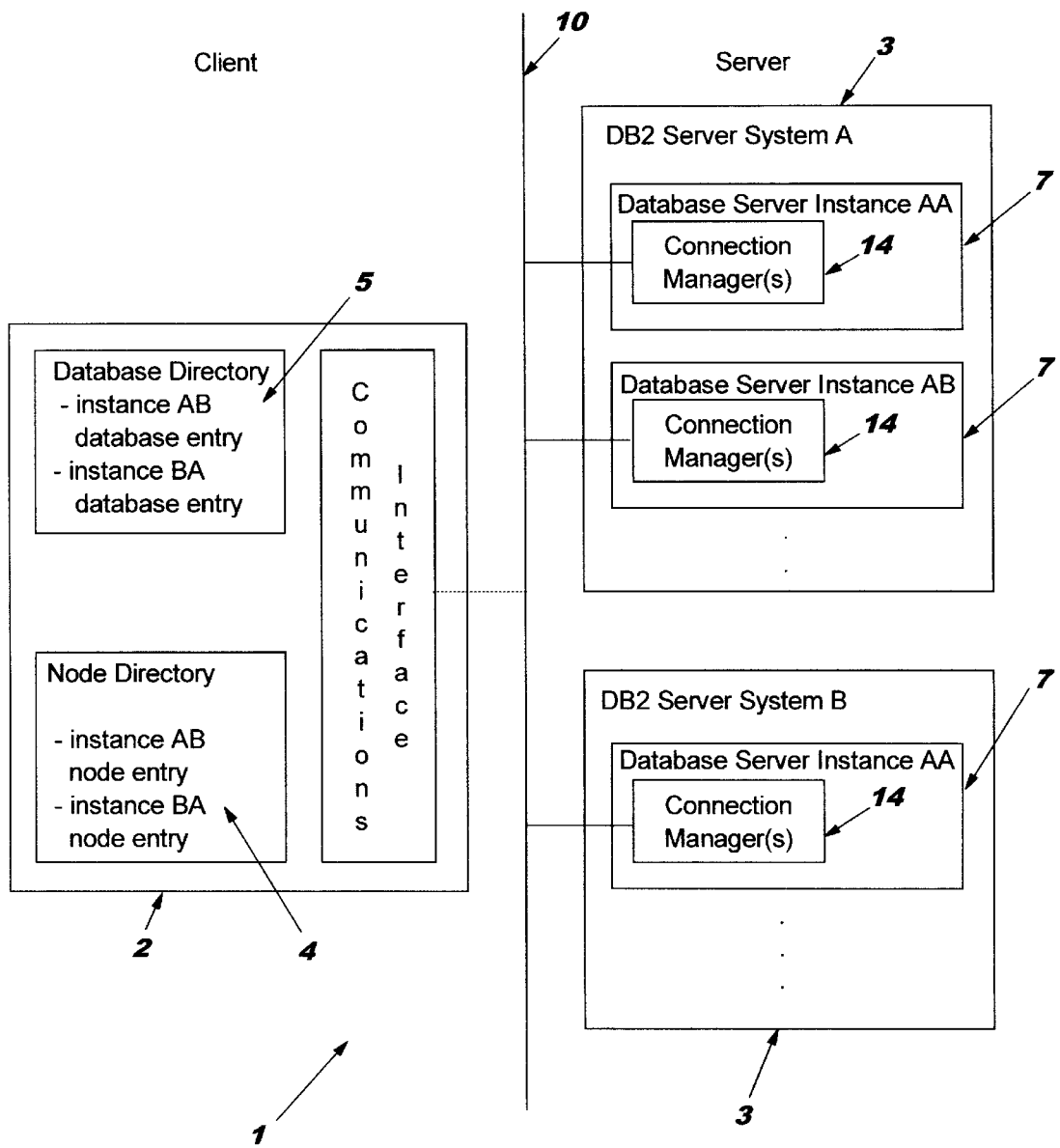
FIG. 1 depicts an information handling client server network having a database server in accordance with the prior art.

Referring to FIG. 1, the client server database network 1 includes a database client 2, and database server systems 3, linked by a communications link 10. The database server system A, in this example includes a number of database server instances 7, database server instance AA, and database server instance AB. Each database server instance contains its own databases and manages its own database resources. For example, in order for a user database client 2 to be able to access the databases in database server instance AA, a ode directory entry 4, and a database directory entry 5 must be created before a client-server connection can be initiated. The information necessary for the construction of catalogs may be difficult for a user of a database client to obtain under the prior art.

Figure 2:
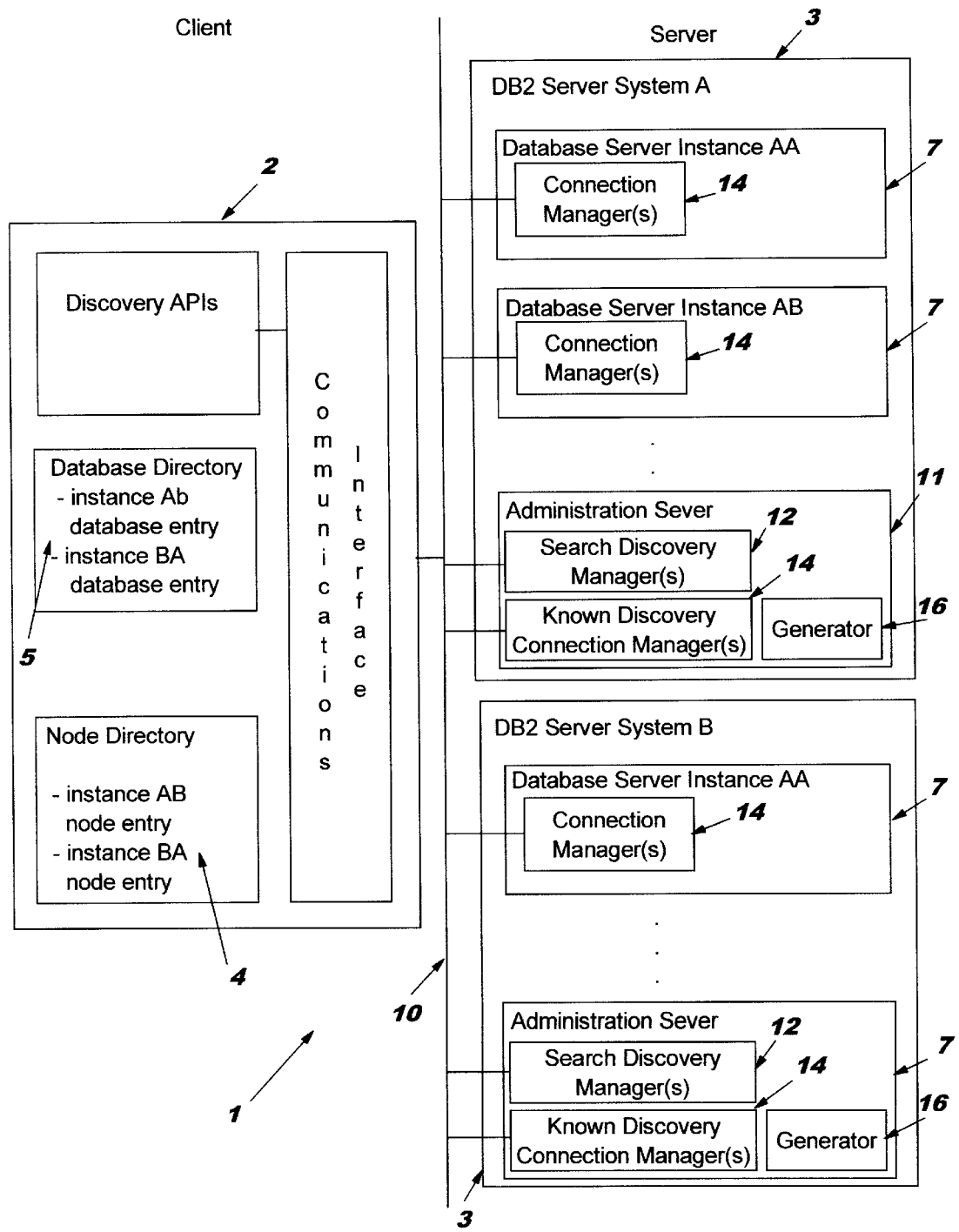
FIG. 2 depicts an information handling client server network having a database server, constructed in accordance with the present invention herein.

FIG. 2 depicts one embodiment of a client server network in accordance with the invention herein. The network includes a database client 2, and one or more database server systems 3, which include database server instances 7; which in turn contain and control databases (not shown). The database server systems 3, each include a database administration server 11, which includes protocol-specific discovery managers 12, and protocol-specific connection managers 14. The database client includes software to initiate requests to the discovery manager(s) 12 and connection manager(s) 14 of each database server system.

In general terms, when a user desires to access databases accessible by the network 1, the user instructs the database client, preferably by means of a simple graphical user interface (GUI) 15 to discover what databases are available to the database client, and to access user-selected databases.

Figure 3:
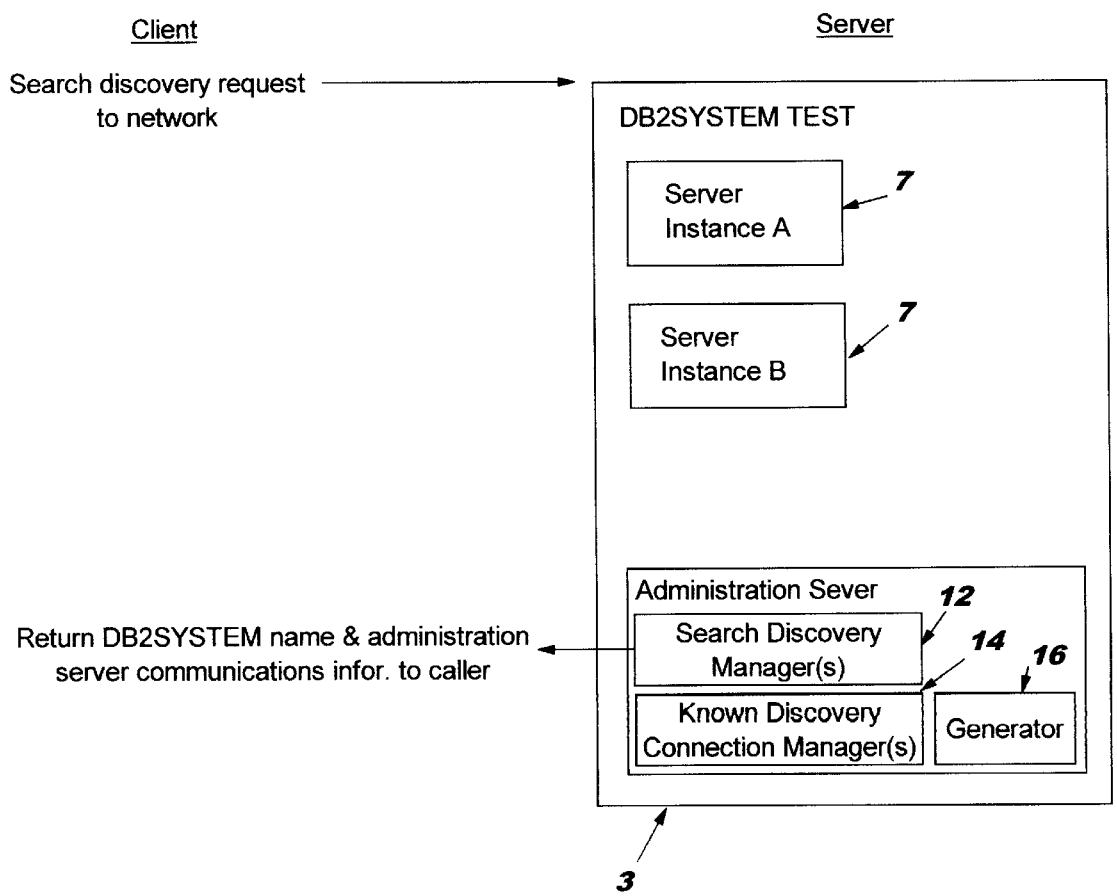
FIG. 3 depicts a method of search discovery in accordance with the present invention using a broadcast mechanism.

The first step, shown in FIG. 3, is called the search discovery step. A protocol-specific communications method is used to find database server systems and return a set of database server system names and protocol-specific addressing information to the database client, preferably to be displayed on a GUI for the user. For example, the protocol-specific communications method can be implemented using a broadcast or multicast request, for protocols supporting this type of request.

As will be appreciated by those skilled in the art to which this invention relates, a broadcast request is one that goes to all network nodes which have a datagram receive listening on a particular port to which the request is sent. A multicast request is one that goes to all network nodes which are registered with a multicast group and only the registered nodes will receive the request.

Figure 4:
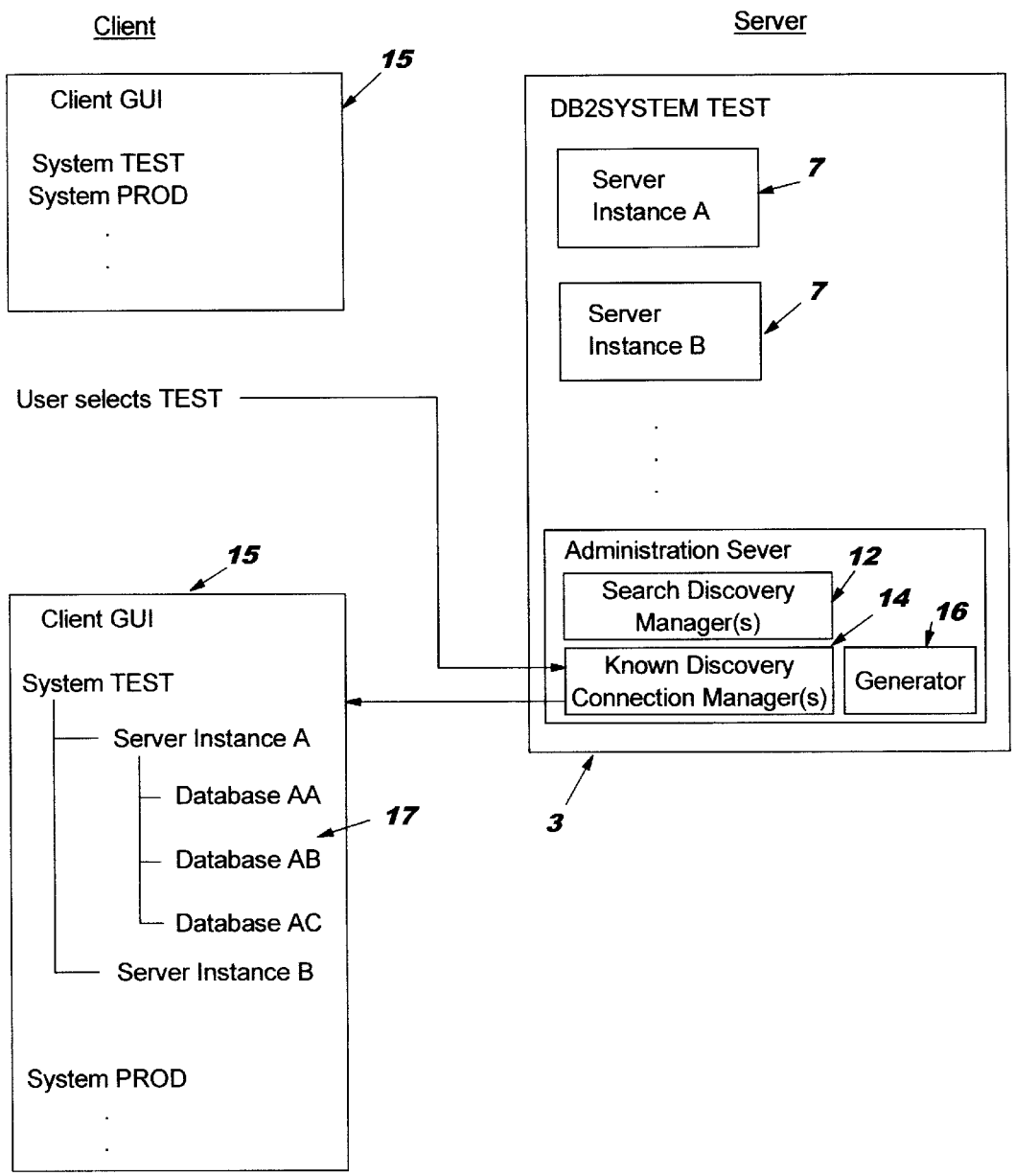
FIG. 4 depict a method of known discovery in accordance with the present invention in which detailed database server system information is requested and returned to the database client.

The second step, shown in FIG. 4, which may be called the known discovery step, involves allowing the user to select database server systems from those presented on the GUI, for the determination of additional information about the selected database server systems. Additional information about the database server system can be comprised of identification of which database server instances reside on the system, the protocols supported by each database server instance, the protocol-specific communications addressing information for those protocols supported, the databases available on the database server instance, security information required to access the database server instance, and any other data relevant for client-server database functionality.

It is preferable that this information be presented by the GUI to the user so that the user may use the well known point and click method of GUI interaction familiar to the users of the OS/2 and Windows GUI systems to select the database server instances of interest and their databases. Preferably this information is presented in a tree form as illustrated in the Client GUI in FIG. 4, allowing the user simple selection choices.

The first step in the procedure, shown in FIG. 3, the search discovery step, requests information which is sent back by the database server system discovery managers. It provides the database server system name and enough communications information to allow the database client to communicate with each database server system; so that when a user selects a database server system (step 2), sufficient communications information will be available for the database client to initiate a client-server connection to the selected database server system and retrieve the information necessary to expand the tree form into database server systems, database server instances, and databases.

During step 2, shown in FIG. 4, known discovery, sufficient database and communications information is resumed to the database client about each database server instance on a user-selected database server system; so that when the user selects a database to access, the database client automatically catalogs node and database directories, for the user to connect to that database.

In the embodiment of the invention described herein, the administration server 11 in each database server system is adapted to respond to administration tasks, including search discovery and known discovery requests from database clients. As indicated above, each database server system can contain multiple database server instances and each database server instance can contain multiple databases, providing a database server system capable of managing and accessing increasingly large amounts of data as required by modern society.

As will be appreciated by those skilled in network communications, different communications protocols exhibit different behaviors and have different conventions. With this in mind, search discovery is performed in accordance with the required protocol using a method that is appropriate for that protocol to find the database server systems on or accessible by the network. For example, using the TCP/IP protocol, a broadcast or multicast request could be issued to find database server systems. Using the NetBIOS protocol, a broadcast could be used to find the database server systems. Using the IPX/SPX protocol IPX/SPX SAP (known as service advertising protocol) could be used to identify the accessible database server systems, or a NetWare file server attached to the database client could be searched for database server systems that have been previously registered at the file server.

In the case of database server systems using the DB2 database management system, the DB2 server systems would respond to the database client search discovery requests; by returning their DB2 system names (for GUI identification purposes) and sufficient communications information about the administration server of the DB2 server system for the database client to attach to the administration server, For each database server system expanded (graphically, in the case of a GUI) in a tree 17 by the user making a selection on the GUI, a request is sent to the appropriate database server system for detailed server instance and database information. Requests are only sent for database server systems selected by the user.

In the embodiment of the invention described in FIG. 4, when a known discovery request is received by an administration server connection manager 14, the request is processed by calling the Generator 16 to generate the database server system information required by the database client. Options may be provided to a database administrator to allow the administrator to configure the database server systems to hide specified database server instances or databases on the system. Server instances and databases that are 'marked' as hidden are not packaged by the generator in the information returned to the database client, so access to these hidden entities will not be accessible to the user from the GUI. This option provides additional security for confidential databases.

As will be readily appreciated from the above description the invention herein results in a simplification of the client configuration required by a user to connect to a desired database.

FIG. 3 illustrates an example of step 1, search discovery using a broadcast method. The client 2 generates a search discovery request to the network. Database server system 3, on the network, such as TEST in this illustration, has a search discovery manager 12 that picks up the search discovery request, and composes a response to be returned to the client, which includes the database server system named, TEST, and administration server communications information. The result of the search discovery request is a list of database server, system names and associated communications information for each database server system found on the network.

The next step in the process may be appreciated by referring to FIG. 4 which depicts an implementation of the known discovery process. As a result of the search discovery process the user has been presented through the Client GUI 15 with database server system names, System TEST and System PROD. User selection of the database system named, TEST, returned from the search discovery request causes the database client to issue a known discovery request to the particular database server system selected, to return detailed information. The database server system, TEST, has a protocol-specific connection manager 14 that receives and parses the request, then calls the Generator 16 to package server system information to be returned to the client for display on the database client GUI 15. Now that information from database server system, TEST, has been returned, the TEST system on the GUI expands to show all server instances accessible to the database client 2. If the user selects a server instance, it in turn is expanded to display all databases available on that server instance. The information is displayed in a tree format 17. The user of the database client can select one of the databases to have the database client auto-configure a connection to the selected database.

The invention herein is applicable to networks employing different protocols for communications.

Figure 5:
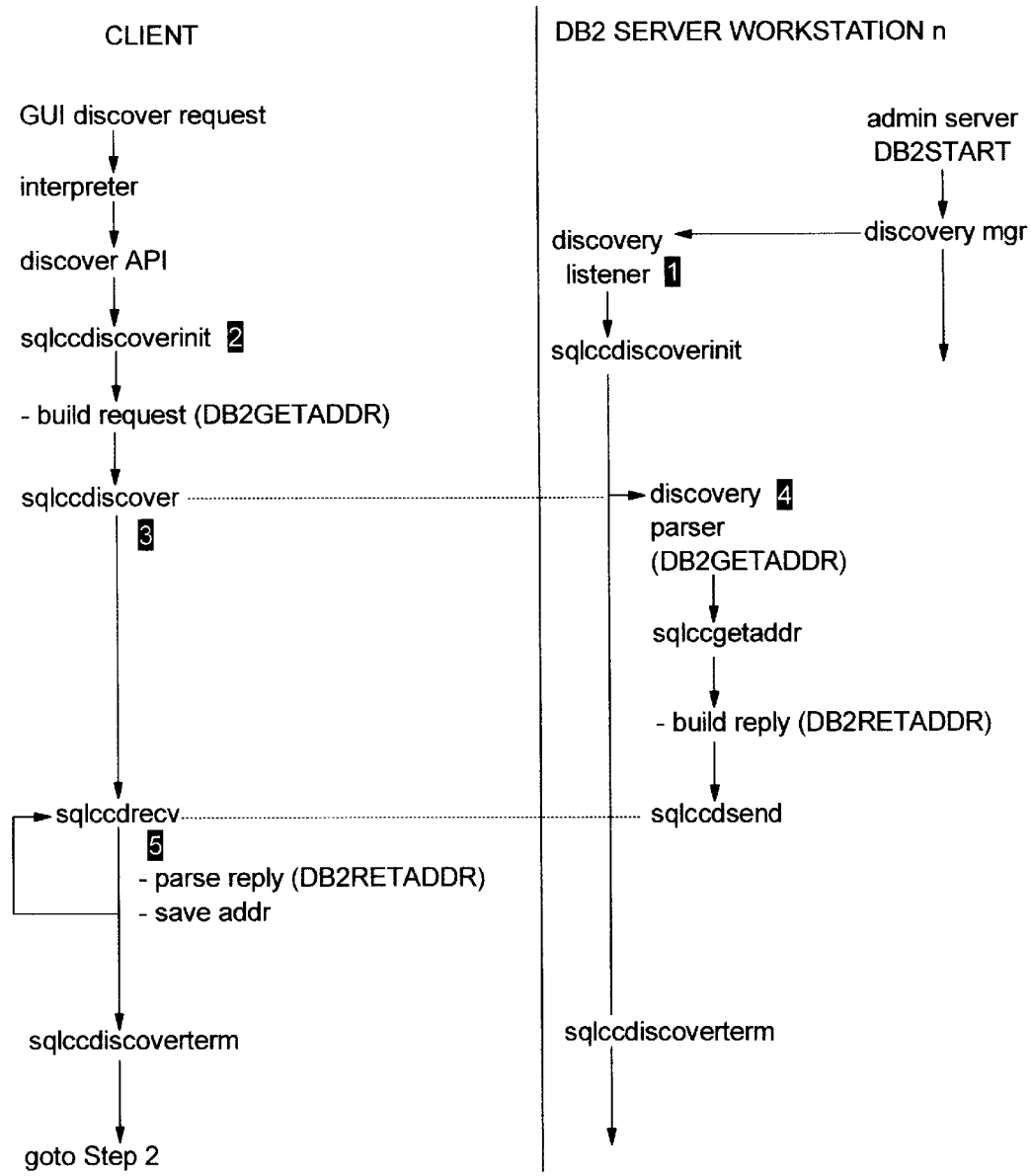
FIG. 5 depicts a detailed flow chart of the broadcast method of search discover.

For instance, networks using either NetBIOS or TCP/IP could use the Broadcast Flow step 1 depicted in FIG. 5 for search discovery and step 2—Directed Flow depicted in FIG. 7 for Known Discovery. IPX/SPX could use the step 1—File Server Flow depicted in FIG. 6 for Search Discovery and step 2—Directed Flow depicted in FIG. 7 for Known Discovery.

[1] Referring to FIG. 5, during DB2 server system boot up, the administration server is started. The administration server brings up a discovery manager and connection manager (see FIG. 7) for each protocol supported and selected, A NetBIOS discovery listener will listen on a receive broadcast datagram call.

A TCP/IP discover listener will open up a datagram socket, bind the socket to accept datagram message from any address that specifies the listener port, set the socket to listen for broadcasts, and listen on a recvfrom call.

A DB2 TCP/IP listener can listen on a port (e.g. 3033/tcp) and accept connections while a discovery listener is listening on the same port (e.g. 3033/udp) and receive broadcasts. NetBIOS broadcasts are only received by names that have a receive broadcast datagram call outstanding i.e.. only NetBIOS discovery listeners). Since a receive broadcast datagram call receives all broadcasts, the NetBIOS discovery parser needs to check the buffer header to ensure that this is actually a discovery broadcast.

[2] When a discover request is issued from the GUI, the Interpreter creates a new process and then calls the internal DB2 discover API to service the request asynchronously.

Discovery calls sqlccdiscoverinit to perform pre-broadcast tasks. Sqlccdiscoverinit loads the protocol specific library (it may not be loaded yet) then calls the protocol specific discovery initialization function (e.g. sqlccnbdiscoverinit, sqlcctcpdiscoverinit). It returns a discovery handle.

Sqlccnbdiscoverinit adds a free NetBIOS name of the form, DB2DSCVR<nname>. This name represents the address of the requesting client and is used to build the DB2GETADDR request.

Sqlcctcpdiscoverinit opens a datagram socket, binds the socket to no particular address, and issues a getsockname call to find the free port allocated to the socket by TCP/IP. The
TCP/IP address and port number are used to build the DB2GETADDR request.

[3] Discovery then calls sqlccdiscover to broadcast the DB2GETADDR request. Sqlccdiscover calls the protocol specific discover function (e.g.. sqlccnbdiscover, sqlcctcpdiscover).

Sqlccnbdiscover issues a send broadcast datagram call, then issues a sqlccdrecv to receive the reply. A configurable number of receive buffers are issued because NetBIOS does not buffer data between receives.

Sqlcctcpdiscover sets the socket option for broadcasting and broadcasts the DB2GETADDR request then issues a sqlccdrecv to receive the reply.

Sqlccnbdiscover and sqlcctcpdiscover will reissue sqlccdrecv calls for a set period of time. The time period will be used to dictate a time when we think discover would have received replies from all systems.

The Discover time-out period is a configuration parameter that is user modifiable.

[4] The DB2 server system will receive the DB2GETADDR request via its discovery listener. The discovery parser will parse the message into a DB2GETADDR request.

The discovery server calls sqlccgetaddr to retrieve the server system address (for the administration server).

Sqlccgetaddr calls the protocol specific get address function (e.g.. sqlccnbgetaddr, sqlcctcpgetaddr). Sqlccnbgetaddr returns the nname of the administration server. Sqlcctcpgetaddr returns the IP address of the system and the port number used by the administration server.

The discovery listener uses the server system address to build the DB2RETADDR reply.

The discovery server then uses the client address sent in the DB2GETADDR request to issue a sqlccdsend call to send the DB2RETADDR reply.

[5] When the DB2 IETADDR reply is received, each reply is processed synchronously.

The DB2RETADDR reply is parsed and the system address is saved in a list of known systems. Then, the server system addresses are used to directly retrieve DB2 server system information See FIG. 7 "Step 2—Directed Flow" for the rest of the discovery flow, and a description of the figure in the following pages.

Step 1—File Server Flow

Figure 6:
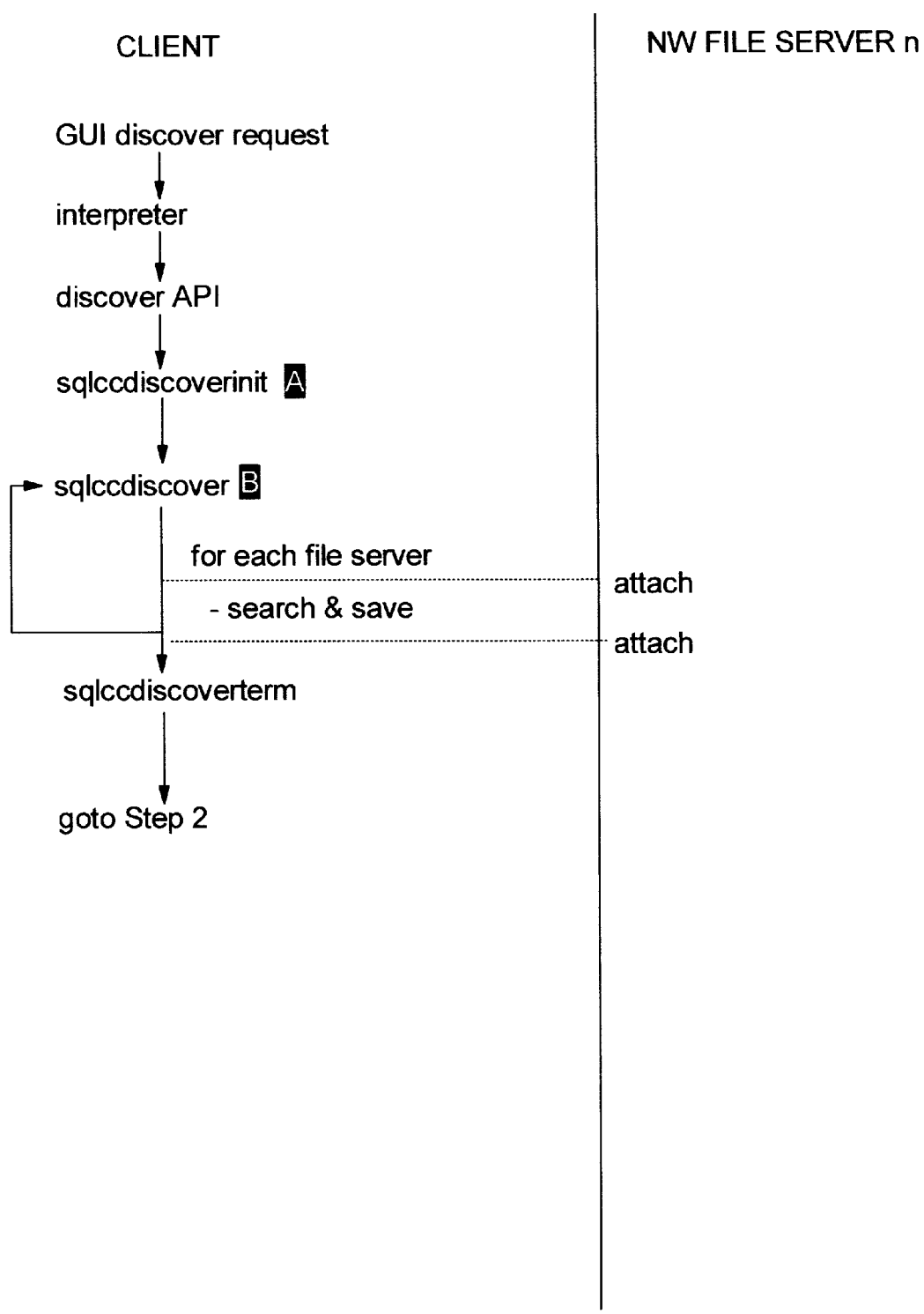
FIG. 6 depicts a detailed flow chart of the file server method of search discovery.

The following text describes the Step 1—File Server Flow depicted in FIG. 6:

(A) When a 'discover systems' request is issued from the GUI, the Interpreter creates a process and then calls the discover API to service the request asynchronously.

Sqlccdiscoverinit loads the protocol specific library (it may not be loaded yet) then calls the protocol specific discovery initialization function (e.g. sqlcctlidiscoverinit). It returns a discovery handle Sqlcctlidiscovernit performs some initial setup tasks.

(B) Discovers then calls sqlccdiscover to find the addresses of DB2 server systems s (administration servers). Sqlccdiscover calls the protocol specific discover function (e.g.. sqlcctlidiscover).

Sqlcctlidiscover looks for an attached file server. If none is found, the user must specify (via the GUI) a list of ore or more file servers to be used. This list is passed to Discover. Even if an attached file server is found, Discover will still use all file servers specified in the list. However, the user specified file server list is optional if an attached file server exists.

For each file server, the client attaches to the file server (if not already attached), then scans the objects in the bindery for objects that have the registered administration server socket number, 87A2, and the DB2 object type, 0x062B. (This is an object type registered with Novell that is specifically for DB2.) All matches to the criteria are DB2 server system addresses (for the administration server). These addresses are saved in a list of known systems. The server system addresses are used to directly retrieve the DB2 server system information. See FIG. 7 "Step 2—Directed Flow" for the rest of the discovery flow, and a description of the figure in the following pages.

The administration server addresses located on the file server were originally placed there when the user issued a REGISTER command/API. REGISTERing is a step required on the administration server and all DB2 server instances that are using IPX/SPX file server addressing.

The following text describes the Step 2—Directed Flow depicted in FIG. 7. After performing step 1 in discovery SEARCH mode, the client has retrieved enough server system address information to directly contact the administration server on each system. The scenario continues in FIG. 7 with the Step 2—Directed Flow.

In discovery KNOWN mode, the user specifies enough administration server communications information (via the GUI) for discovery to directly contact the administration server, for each system specified. In discovery KNOWN mode, the scenario starts with the Step, 2—Directed Flow. Note: Since it is possible for the known DB2 system list to contain duplicate systems (e.g.. when discovery on, a system supports more than one discovery protocol), duplicates will be removed.

[6] For each address in the list of known DB2 systems, discovery issues an unauthenticated attach API call. This forms an unauthenticated (i.e.. no userid/password required) connection to the DB2 administration server.

[7] Discovery then builds a DB2 GETINFOSZ request with no data and issues a sqlccsend call to send the request.

[8] The agent receives the Discover service message and calls Discovery to service the request.

[9] Discovery recognizes the GETINFOSZ request and calls the Generator to package the DB2 server system information and return the size.

[10] Discovery builds a RETINFOSZ reply, packaging the information size returned by the Generator, and sends the reply to the client.

[11] The RETINFOSZ reply is received at the client, parsed, and the data is byte-reversed, if necessary.

[12] The system information size returned is used to build a GETINFO request.

[13] The GETINFO request is received by Discovery on the server and parsed.

[14] Discovery builds a RETINFO reply, packaging the information returned by the Generator, and sends the reply to the client.

[15] The RETINFO reply is received at the client and parsed.

[16] Discovery issues a detach API call to cleanup the connection to the DB2 system server.

[17] The data returned is passed to the Interpreter.

Functions depicted in FIGS. 5, 6, and 7 are detailed in the following pseudo code which is included herein in the Appendix which follows below. Software coding of the invention may be implemented in the database clients and database servers of a client server network using this pseudo code as a base for developing software adapted for a particular software product that runs on particular network hardware. The foregoing has served to describe the structure and operation of the present invention. It will be evident to those skilled in the art that a number of variants of the structure and functionality are substantially equivalent and therefore, are considered within the scope of the present invention.

The embodiments the invention in which an exclusive property or privilege is claimed are defined as follows:

1. A client server information handling network having one or more database server systems controlling at least one database, at least one database client and a communications link between said servers and said client; said network including: discovery means for said database client to identify database servers accessible from said network, said discovery means comprising:
   search discovery means associated with said database client for generating a database discovery inquiry comprising a database search discovery request to identify said database server systems;
   database discovery manager means associated with said database servers, said database discovery manager means being adapted to respond to said search discovery request by returning addressing information to permit selection of said database servers by said database client.

2. The network of claim 1 including means associated with said client to respond to receive said addessing information provided by said database discovery manager and to display said information to a user of said client.

3. The network of claim 2 including:
   known discovery means associated with said client for generating a database known discovery request to a selected database server system previously identified to determine detailed database server system information.

4. The network of claim 3 wherein database connection manager means associated with said selected database server is adapted to respond to said known discovery request by packaging detailed database server system information relating to said selected database server system to permit access to databases on said system.

5. The network of claim 4 including means associated with said client to respond to receive said detailed database server system information and to display said information to a user of said client.

6. The network of claim 5 including a graphical display interface means (GUI) to display server system information to a user, said GUI being adapted to respond to user input to initiate said search discovery request and said known discovery request.

7. The network of claim 6 wherein said GUI is responsive to selection by a user to initiate said search discovery request, displays server system names returned, and is further responsive to selection of a database server system displayed on said GUI to expand the display of said selected database server system by initiating the generation of a known search request and depicting the detailed database server system information returned in treelike fashion, identifying the databases controlled by said selected database server system.

8. The network of claim 7 wherein said GUI is further responsive to said pointer selection of an identified database by auto-configuring for a database access request.

9. The network of claim 8 wherein said database server system controls a plurality of database server instances, and wherein each of said database server instances controls at least one database.

10. A client server information handling network having one or more database server systems controlling at least one database, at least one database client and a communications link between said servers and said client: said network including:
   discovery means for said database client to identify database servers accessible from said network, said discovery means comprising:
      search discovery means associated with said database client for generating a database discovery inquiry comprising a database search discovery request to identify said database server systems:
      database discovery manager means associated with said database servers, said database discovery manager means being adapted to respond to said search discovery request by returning addressing information to permit selection of said database servers by said database client, including:
      means associated with said client to respond to receive said addressing information provided by said database discovery manager and to display said information to a user of said client; and
      known discovery means associated with said client for generating a database known discovery request to a selected database server system previously identified to determine detailed database server system information wherein database connection manager means associated with said selected database server is adapted to respond to said known discovery request by packaging detailed database server system information relating to said selected database server system to permit access to databases on said system, including means associated with said client to respond to receive said detailed database server system information and to display said information to a user of said client;
   wherein said database server system further comprises:
      discovery manager and connection manager means adapted to listen for discovery requests on said network, and are comprised of:
      request receiver means to receive said discovery requests,
      request parser means to parse said requests for processing,
      request service means for responding to said parsed requests, and in response to:
      (a) the receipt of a search discovery request obtains and packages database server system name and protocol—specific addressing information, and
      (b) the receipt of a known discovery request for a specified database server system, obtains and packages detailed information for any database server instances associated with said specified database server system and databases controlled by said database server instances; and
      communications response means adapted to transmit said packaged database server system addressing information and said packaged detailed database server system information to any database client requesting said information.

11. A client server communication network as claimed in claim 10, said network including a graphical display interface means (GUI) to display server system information to a user, said GUI being adapted to respond to user input to initiate said search discovery request and said known discovery request wherein said GUI is responsive to selection by a user to initiate said search discovery request, displays server system names returned, and is further responsive to selection of a database server system displayed on said GUI to expand the display of said selected database server system by initiating the generation of a known search request and depicting the detailed database server system information returned in treelike fashion, identifying the databases controlled by said selected database server system.

12. A method of identifying databases in a client server information handling network having one or more database server systems controlling at least one database, at least one database client and a communications link between said servers and said client, comprising:
 generating a database discovery inquiry for said client comprising a database search discovery request to identify said database server systems;
 using database discovery manager means associated with said database servers to respond to said search discovery request by returning addressing information to permit selection of said database servers by said database client.

13. The method of claim 12 including means associated with said client to respond to receive said addressing information provided by said database discovery manager and to display said information to a user of said client.

14. The method of claim 13 including generating a database known discovery request for said client to a selected database server system previously identified to determine detailed database server system information.

15. The method of claim 14 wherein said selected database server responds to said known discovery request by packaging detailed database server system information relating to said selected database server system to permit access to databases on said system.

16. The method of claim 15 wherein said client responds to receive said detailed database server system information and displays said information to a user of said client.

17. The method of claim 16 wherein a graphical display interface means (GUI) displays server system information to a user, and responds to user input to initiate said search discovery request and said known discovery request.

18. The method of claim 17 wherein said GUI responds to selection by a user, to initiate said search discovery request, displays server system names returned, and is further responsive to the selection of a database server system displayed on said GUI to expand the display of said selected database server system by initiating the generation of a known search request and depicting the detailed database server system returned in treelike fashion, identifying the databases controlled by said selected database server system.

19. The method of claim 18 wherein said GUI further responds to selection of an identified database by auto-configuring for a database access request.

20. The method of claim 19 wherein said database server system controls a plurality of database server instances, and wherein each of said database server instances controls at least one database.

21. A method of identifying databases in a client server information handling network having one or more database server systems controlling at least one database, at least one database client and a communications link between said servers and said client, comprising:
 generating a database discovery inquiry for said client comprising a database search discovery request to identify said database server systems;
 using database discovery manager means associated with said database servers to respond to said search discovery request by returning addressing information to permit selection of said database servers by said database client, including:
 means associated with said client to respond to receive said addressing information provided by said database discovery manager and to display said information to a user of said client; and
 generating a database known discovery request for said client to a selected database server system previously identified to determine detailed database server system information; wherein said selected database server responds to said known discovery request by packaging detailed database server system information relating to said selected database server system to permit access to databases on said system, wherein said client, responds to receive said detailed database server system information and displays said information to a user of said client; wherein said database server system comprises:
 listens for discovery requests on said network, receives said discovery requests, parses said requests for processing, responds to said parsed requests, and in response to:
 (a) the receipt of a search discovery request obtains and packages database server system name and protocol—specific addressing information, and
 (b) the receipt of a known discovery request for a specified database server system, obtains and packages detailed information for any database server instances associated with said specified database server system and databases controlled by said database server instances;
 and is adapted to transmit said packaged database server system addressing information and said packaged detailed database server system information to any database client requesting said information.

22. The method of claim 21 wherein a graphical display interface means (GUI) displays server system information to a user, and responds to user input to initiate said search discovery request and said known discovery request.

23. A computer program product for establishing a client server information handling network having one or more database server systems controlling at least one database, at least one database client and a communications link between said servers and said client; said computer program product including a storage medium and software routine means stored on said storage medium for establishing said network including:
 software routine means for establishing discovery means for said database client to identify database servers accessible with said network, said discovery means comprising:
 search discovery means associated with said database client for generating a database discovery inquiry comprising a database search discovery request to identify said database server systems;
 software routine means for establishing database discovery manager means associated with said database servers, said database discovery manager means being adapted to respond to said search discovery request by returning addressing information to permit selection of said database servers by said database client.

24. The computer program product of claim 23 including software routine means to establish means associated with said client to respond to receive said addressing information provided by said database discovery manager and to display said information to a user of said client.

25. The computer program product of claim 24 including:
 software routine means for establishing known discovery means associated with said client for generating a database known discovery request to a selected database server system previously identified to determine detailed database server system information.

26. The computer program product of claim 25 including software routine means for establishing database connection manager means associated with said selected database server adapted to respond to said known discovery request by packaging detailed database server system information relating to said selected database server system to permit access to databases on said system.

27. The computer program product of claim 26 including software routine means for establishing means associated with said client to respond to receive said detailed database server system information and to display said information to a user of said client.

28. The computer program product of claim 27 including software routine means for enabling a graphical display interface means (GUI) to respond to user input to initiate said search discovery request and said known discovery request.

29. The computer program product of claim 28 wherein said software routine means enables said GUI to be responsive to selection by a user to initiate said search discovery request, displays server system names returned, and is further responsive to selection of a database serves system displayed on said GUI to expand the display of said selected database server system by initiating the generation of a known search request and depicting the detailed database server system information returned in treelike fashion, identifying the databases controlled by said selected database server system.

30. The computer program product of claim 29 wherein said software routine means enables said GUI to be further responsive to selection of an identified database by auto-configuring for a database access request.

31. The computer program product of claim 30 wherein said network established by said computer program product includes a database server system which controls a plurality of database server instances, and wherein each of said database server instances controls at least one database.

32. A computer program product for establishing a client server information handling network having one or more database server systems controlling at least one database, at least one database client and a communications link between said servers and said client; said computer program product including a storage medium and software routine means stored on said storage medium for establishing said network including;

software routine means for establishing discovery means for said database client to identify database servers accessible with said network, said discovery means comprising:

search discovery means associated with said database client for generating a database discovery inquiry comprising a database search discovery request to identify said database server systems;

software routine means for establishing database discovery manager means associated with said database servers, said database discovery manager means being adapted to respond to said search discovery request by returning addressing information to permit selection of said database servers by said database client, including:

software routine means to establish means associated with said client to respond to receive said addressing information provided by said database discovery manager and to display said information to a user of said client;

software routine means for establishing known discovery means associated with said client for generating a database known discovery request to a selected database server system previously identified to determine detailed database server system information;

software routine means for establishing database connection manager means associated with said selected database server adapted to respond to said known discovery request by packaging detailed database server system information relating to said selected database server system to permit access to databases on said system and, software routine means for establishing means associated with said client to respond to receive said detailed database server system information and to display said information to a user of said client, further comprising software routine means for establishing said database server system with:

discovery manager and connection manager means adapted to listen for discovery requests on said network, and are comprised of:

request receiver means to receive said discovery requests, request parser means to parse said requests for processing, request service means for responding to said parsed requests, and in response to:

(a) the receipt of a search discovery request obtains and packages database server system name and protocol—specific addressing information, and (b) the receipt of a known discovery request for a specified database server system, obtains and packages detailed information for any database server instances associated with said specified database server system and databases controlled by said database server instances; and communications response means adapted to transmit said packaged database server system addressing information and said packaged detailed database server system information to any database client requesting said information.

33. The method of claim 11 wherein said GUI responds to selection by a user, to initiate said search discovery request, displays server system names returned, and is further responsive to the selection of a database server system displayed on said GUI to expand the display of said selected database server system by initiating the generation of a known search request and depicting the detailed database server system returned in treelike fashion, identifying the databases controlled by said selected database server system.

\* \* \* \* \*